United States Patent [19]

Ting

[11] 3,998,016
[45] Dec. 21, 1976

[54] BLOW-IN/BLOW-OUT WALL STRUCTURE

[75] Inventor: Raymond M. L. Ting, Pittsburgh, Pa.

[73] Assignee: H. H. Robertson Company, Pittsburgh, Pa.

[22] Filed: Nov. 6, 1975

[21] Appl. No.: 629,418

Related U.S. Application Data

[63] Continuation-in-part of Ser. No. 557,998, March 13, 1975.

[52] U.S. Cl. .................................... 52/232; 52/235; 52/395; 52/481; 52/483; 52/508; 52/547
[51] Int. Cl.² ........................ E04C 2/46; E04B 1/98
[58] Field of Search ............ 52/206, 395, 400, 508, 52/208, 573, 397, 235, 547, 479, 232, 480, 481, 483, 509

[56] References Cited

UNITED STATES PATENTS

| | | | |
|---|---|---|---|
| 2,280,142 | 4/1942 | Daniels | 52/573 X |
| 2,724,465 | 11/1955 | Krauss et al. | 52/483 X |
| 2,847,099 | 8/1958 | Gruber | 52/483 |
| 3,016,998 | 1/1962 | Buchmeier | 52/479 |
| 3,016,999 | 1/1962 | Glasoe, Jr. | 52/480 |
| 3,150,749 | 9/1964 | Robrecht et al. | 52/1 |
| 3,173,523 | 3/1965 | Mote | 52/508 X |
| 3,182,764 | 5/1965 | Yake | 52/208 X |
| 3,258,890 | 7/1966 | Dirkse | 52/208 X |
| 3,340,654 | 9/1967 | Maier, Jr. | 52/97 |
| 3,363,376 | 1/1968 | Wendel et al. | 52/1 X |
| 3,386,215 | 6/1968 | Wendel et al. | 52/1 |
| 3,392,489 | 7/1968 | Johnson et al. | 52/1 X |
| 3,418,772 | 12/1968 | Helgesen | 52/397 |
| 3,474,583 | 10/1969 | Manias | 52/481 X |
| 3,785,106 | 1/1974 | Fink | 52/397 X |
| 3,805,465 | 4/1974 | Dietrich | 52/235 |
| 3,807,106 | 4/1974 | Reinhardt | 52/1 X |

FOREIGN PATENTS OR APPLICATIONS 590,473  1/1960  Canada ............................. 52/480

Primary Examiner—Price C. Faw, Jr.
Assistant Examiner—Leslie A. Braun
Attorney, Agent, or Firm—Harry B. Keck; George E. Manias

[57] ABSTRACT

A wall structure of the double-skin insulated type which spans across at least first and second building frame members. The wall structure comprises a liner sheet positively secured to the second frame member and having a liner sheet end lapping the first frame member; confinement means releasably retaining the liner sheet end to the first frame member; a facing sheet positioned outboard of the liner sheet; and at least two subgirts (a) entirely spaced-apart from the first frame member in the direction of the second frame member and from each other, (b) positioned between the facing sheet and the liner sheet, and (c) each secured to the facing sheet and to the liner sheet.

The arrangement is such that the wall structure fails in a particular manner when subjected to abnormally high positive or negative wind pressures of preselected value. The failure load of the wall structure is controlled by the end-subgirt spacing — the distance between the first frame member and the subgirt adjacent thereto. During failure, the wall structure slides free of the confinement means and collapses along the first frame member in the direction of the applied load, but remains positively connected to the second frame member.

A single-span wall structure may be provided wherein distinct confinement means releasably retain the opposite liner sheet ends on the first and second adjacent frame members. At least two subgirts are provided, one adjacent the first frame member but entirely spaced-apart therefrom in the direction of the second frame member, and one adjacent the second frame member but entirely spaced-apart therefrom in the direction of the first frame member. When subjected to abnormally high positive or negative wind pressures of preselected value, the single-span wall structure slides free of either or both of the distinct confinement means and collapses in the direction of the applied load.

The present wall structure protects the structural framework from being overstressed during tornadoes or hurricanes; and also is capable of quickly relieving excessive pressures generated by an explosion within the building.

38 Claims, 26 Drawing Figures

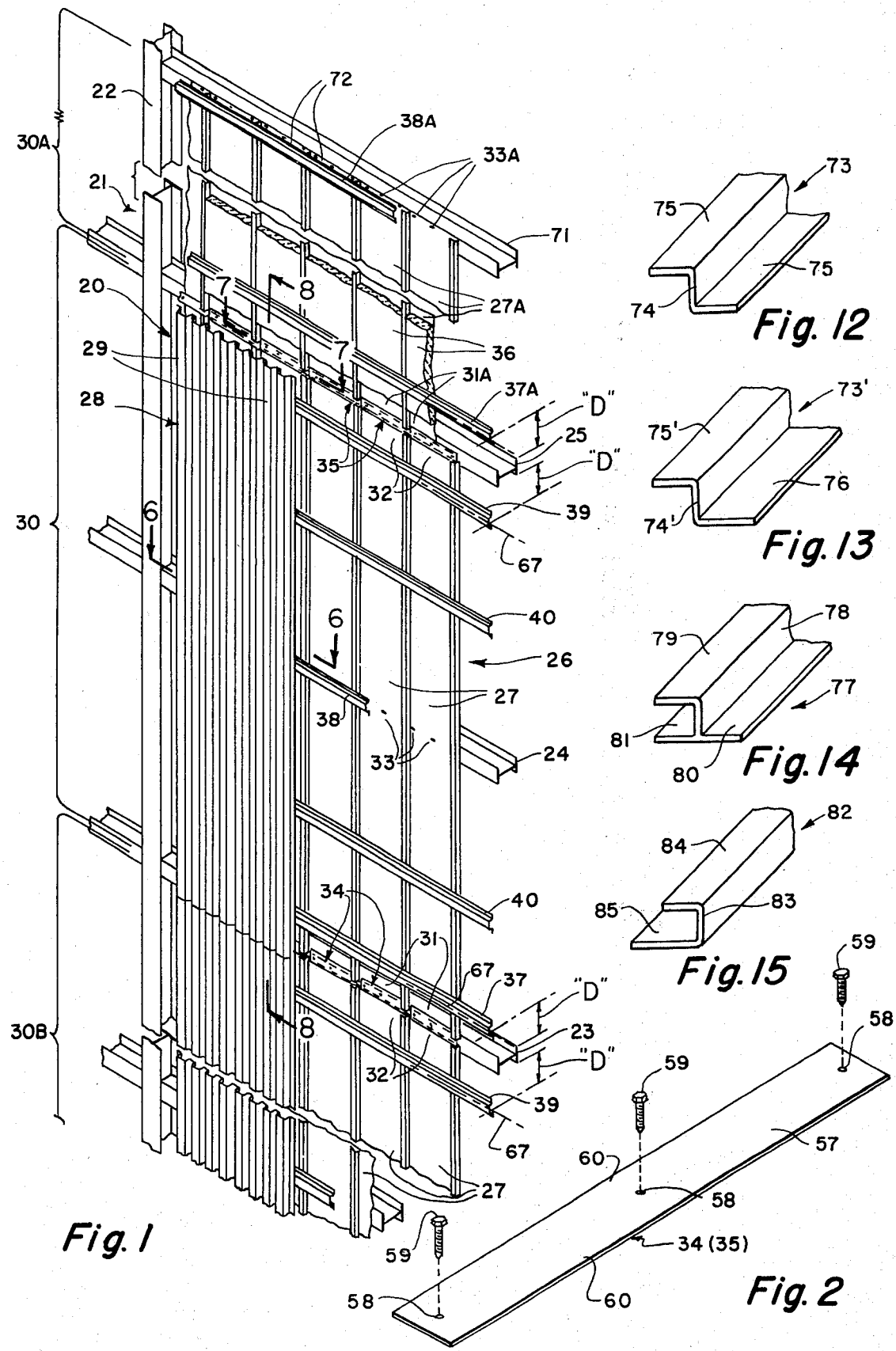

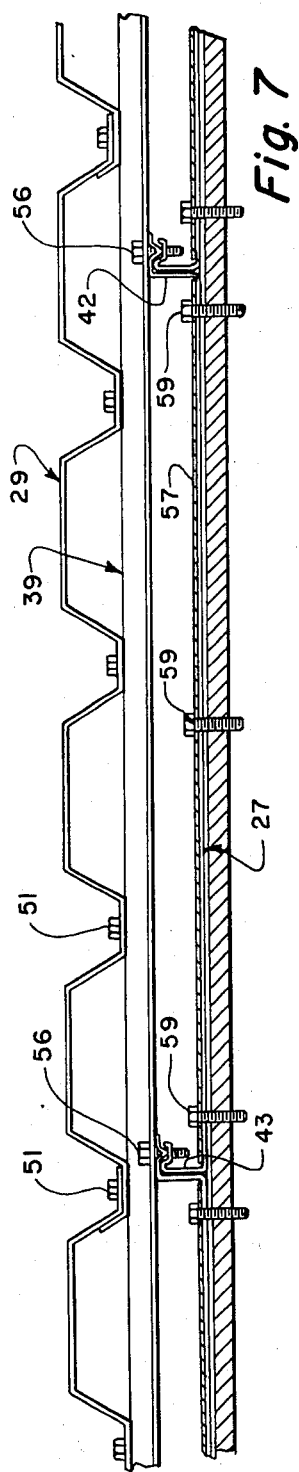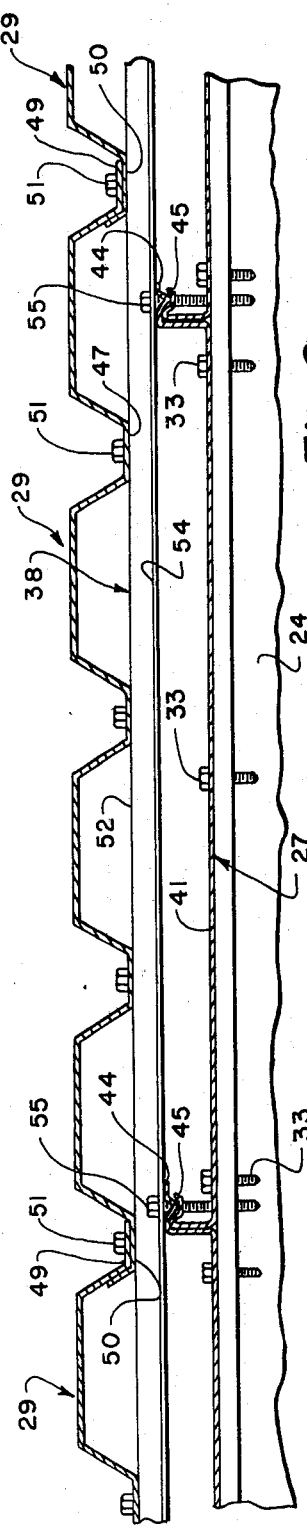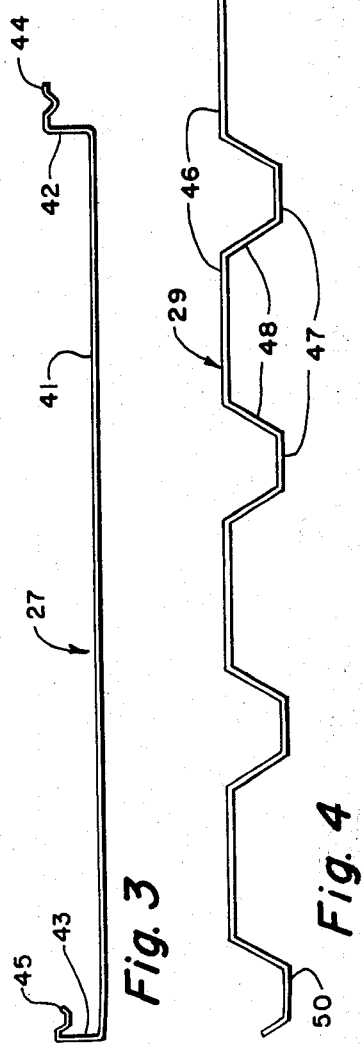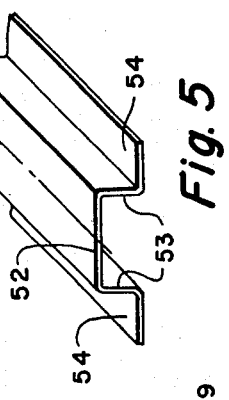

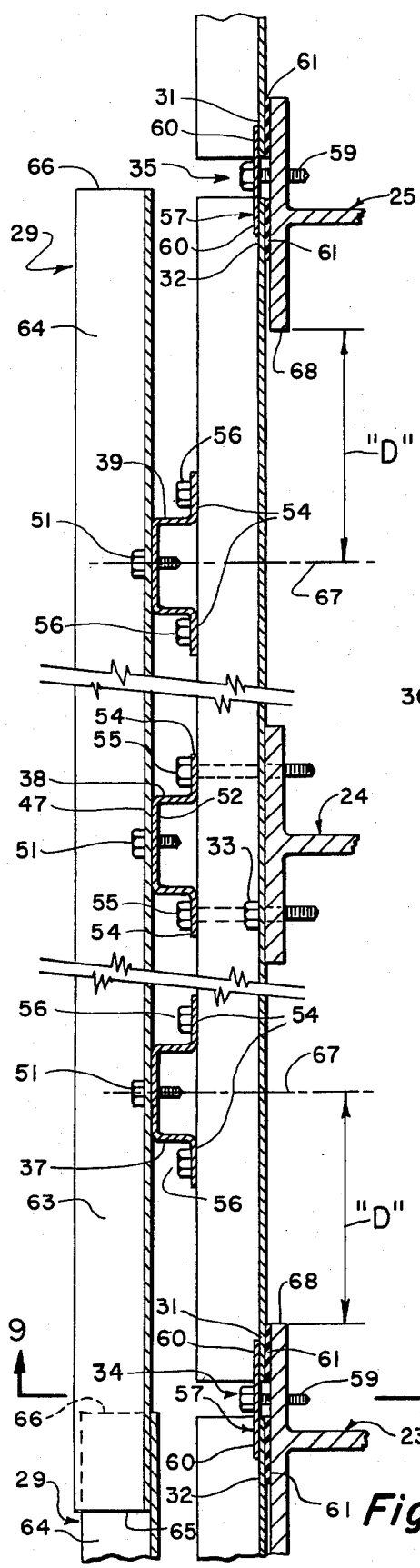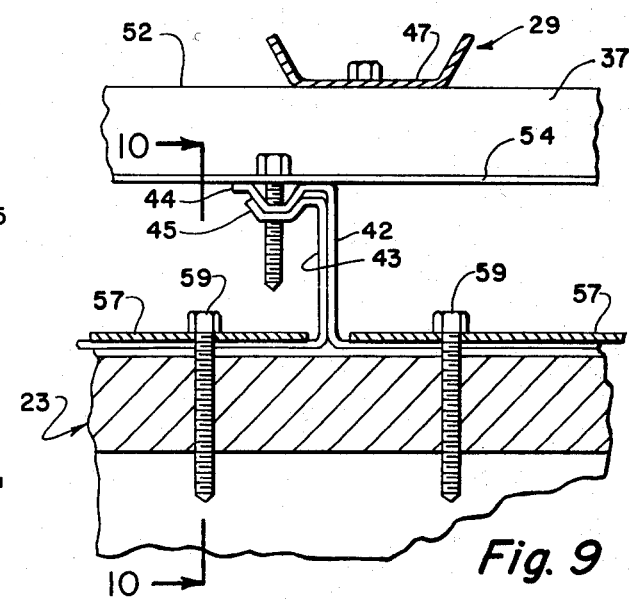
Fig. 9
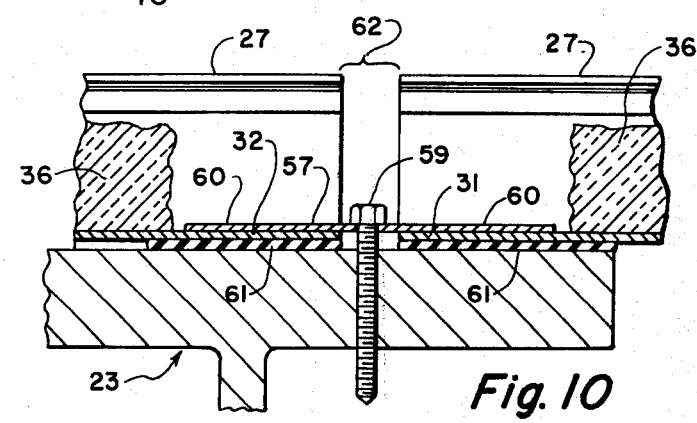
Fig. 10
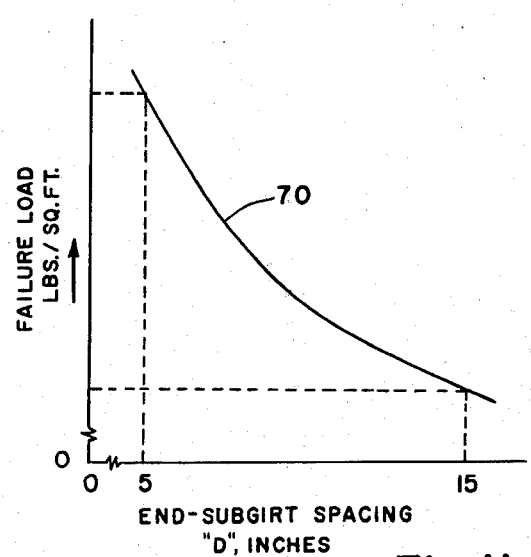
Fig. 8
Fig. 11

BLOW-IN/BLOW-OUT WALL STRUCTURE

CROSS-REFERENCES TO RELATED APPLICATIONS

This application is a continuation-in-part of copending application Ser. No. 557,998 filed Mar. 13, 1975 and assigned to the assignee of this invention.

BACKGROUND OF THE INVENTION

1. Field of the Invention

This invention relates to building wall structures, and more particularly to blow-in/blow-out wall structures adapted to collapse inwardly or outwardly relative to the building framework when acted upon by abnormally high positive or negative wind pressures.

2. Description of the Prior Art

In the past, building wall structures have been adapted to be separated from the structural framework — usually away from the framework — when the wall structure experiences a selected elevated pressure. Such elevated pressures may be created by explosions occurring within the confines of the building or by abnormally high negative wind pressures.

Such wall structures have been provided with panels or panel portions held in place by resilient members. See for example U.S. Pat. Nos. 3,112,535; 3,150,749; 3,258,890.

In another arrangement, the wall panels are provided with clip angles which are secured to the frame members by releasable fastening means, such as fasteners of the type which will fail in shear or in tension. See for example U.S. Pat. No. 3,258,887.

In still another arrangement, the wall panels are secured to the structural framework by pressure release fasteners which incorporate a deformable metal washer which is forced over the fastener head during release of the panel. See for example U.S. Pat. No. 3,828,493.

Blow-out roof structures also are known which incorporate flat metal sheets having their entire peripheral edge releasably clamped to supporting structure, see for example U.S. Pat. No. 3,363,376. In another blow-out roof structure, roof sheets are connected by prebent sheets adapted to be deformed by explosive pressures within the separator, and wherein the peripheral edges of the roof structure are releasably clamped to the supporting structure, see U.S. Pat. No. 3,386,215.

SUMMARY OF THE INVENTION

The principal object of this invention is to provide a wall structure of the double-skin insulated type, adapted to collapse at a specified wind pressure, such as produced during tornadoes or hurricanes, thereby to prevent over-loading the building framework.

Another object of this invention is to provide a wall structure having a blow-in/blow-out feature, whereby the building structural framework need not be designed for full tornado or hurricane loads.

Still another object of this invention is to provide a wall structure adapted to collapse at specified failure loads.

A further object of this invention is to provide a double-skin wall structure wherein the end-subgirt spacing — the distance between the frame member and the adjacent subgirt — controls the failure load of the wall structure.

The present invention provides a wall structure of the double-skin insulated type having a blow-in/blow-out feature which protects the building structural framework from being overloaded when the wall structure experiences abnormally high wind loadings such as produced during tornadoes and hurricanes. In brief, the present wall structure when erected as a double-span structure fails in bending at the center support and the opposite ends of the wall structure disengage from the end supports. The wall structure collapses inwardly or outwardly depending on whether the wind loading is positive or negative. In its collapsed configuration, the wall structure transmits a minimal wind loading to the structural framework of the building. Positive fasteners placed at the center support prevent the wall structure from becoming completely disengaged from the structural framework. The present wall structure may also operate to release excessive pressures, such as generated by an explosion within the interior of the building.

The present wall structure may also be erected as a single-span structure wherein one end is slideably retained on one frame member and the opposite end is positively secured to the adjacent frame member.

In accordance with a first embodiment of the present invention, a blow-in/blow-out wall structure is provided which is erected on a building framework including first and second spaced-apart frame members which are adjacent to each other.

The present wall structure is applicable to single-span and double-span conditions. In either instance, the wall structure comprises a liner sheet which spans the distance between adjacent first and second frame members and has a liner sheet end lapping the first frame member. Confinement means releasably retain the liner sheet end to the first frame member. Fastening means positively secures the liner sheet to the second frame member. A facing sheet is positioned outboard of and in spaced-apart parallel relation with the liner sheet. At least first and second subgirts, entirely spaced-apart from the first frame member in the direction of the second frame member and from each other, are positioned between the facing sheet and the liner sheet, and each is secured to the facing sheet and to the liner sheet.

The present wall structure may also be erected as a single-span wall structure wherein the opposite ends thereof are slideably retained on the adjacent frame members. Thus in accordance with a second embodiment of the present invention, a single-span wall structure is provided comprising a liner sheet spanning the distance between first and second adjacent frame members and having opposite liner sheet ends lapping the first and second frame members; first and second confinement means releasably retaining the liner sheet ends on the first and second frame members; a facing sheet positioned outboard of the liner sheet; and at least two subgirts, one adjacent the first frame member but entirely spaced-apart therefrom in the direction of the second frame member, and one adjacent the second frame member but entirely spaced-apart therefrom in the direction of the first frame member. The two subgirts are positioned between the facing sheet and the liner sheet, and each is secured to the facing sheet and to the liner sheet.

In the first embodiment of the present wall structure, the first or end-subgirt, i.e., the subgirt adjacent to the first frame member, is positioned such that, for example, a longitudinal line of an element of the end-subgirt is spaced at a selected distance from the first frame member. In the second embodiment of the present wall structure at least one of the two subgirts is positioned such that a longitudinal line of an element thereof is spaced at a selected distance from the adjacent first frame member, whereas the second of the two subgirts is positioned such that, for example, a longitudinal line of an element thereof is spaced from the adjacent second frame member at a distance which is less than or equal to the aforesaid selected distance.

The selected distance or distances may range from about 5 to about 15 inches. Failure loads ranging from about 20 to about 150 pounds per square foot can be provided. The useful range of failure loads is from about 40 to about 120 pounds per square foot.

BRIEF DESCRIPTION OF THE DRAWINGS

FIG. 1 is a fragmentary isometric view illustrating the blow-in/blow-out wall structure of this invention erected on a structural framework of a building;

FIG. 2 is an isometric view of the confinement means of this invention;

FIG. 3 is an end view of a typical liner sheet;

FIG. 4 is an end view of a typical facing sheet;

FIG. 5 is a fragmentary isometric view of a typical subgirt;

FIG. 6 is a fragmentary cross-sectional view taken along the line 6—6 of FIG. 1;

FIG. 7 is a fragmentary cross-sectional view taken along the line 7—7 of FIG. 1;

FIG. 8 is a fragmentary, broken cross-sectional view taken along the line 8—8 of FIG. 1;

FIG. 9 is a fragmentary cross-sectional view taken along the line 9—9 of FIG. 8;

FIG. 10 is a fragmentary cross-sectional view taken along the line 10—10 of FIG. 9;

FIG. 11 is a graphical presentation of the general relationship between the failure load of the double-skin wall structure of this invention and the end-subgirt spacing of the wall structure;

FIGS. 12 through 15 are fragmentary isometric views of typical alternative subgirts;

DESCRIPTION OF THE PREFERRED EMBODIMENT(S)

Figure 16:
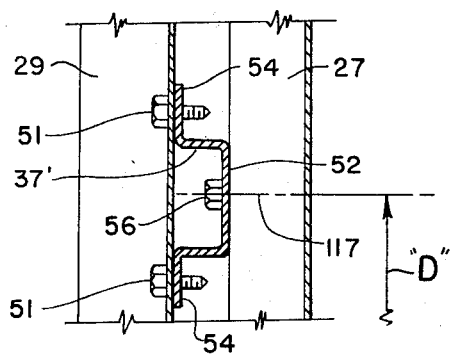
FIGS. 16 through 20 are fragmentary cross-sectional views illustrating the subgirts of FIGS. 12 through 15, respectively, installed between a facing sheet and a liner sheet.
Figure 17:
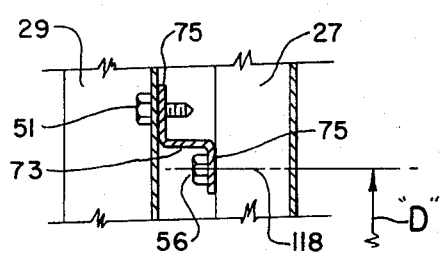
Figure 18:
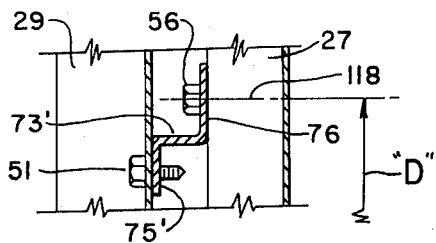
Figure 19:
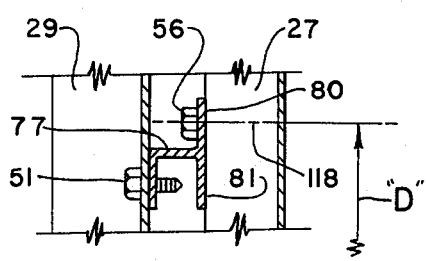
Figure 20:
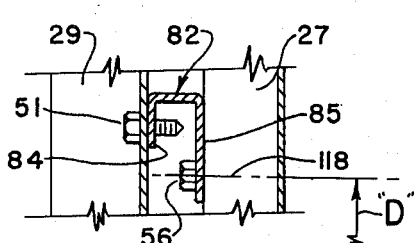

FIG. 1 illustrates a wall structure 20 of this invention erected on a structural framework 21 of which only a vertical column 22 and first, second and third frame members or girts 23, 24 and 25 are illustrated. The present wall structure 20 comprises an inner sheath 26 assembled from a plurality of liner sheets 27; and an outer sheath 28 assembled from a plurality of facing sheets 29. In the illustrated arrangement, the liner sheets 27 and the facing sheets 29 extend from the first frame member 23, across the second frame member 24 to the third frame member 25. The present wall structure 20 preferably is erected as a double-span wall section 30. The present wall structure may also be erected as a single-span construction.

The liner sheets 27 have first and second liner sheet ends 31, 32 lapping the first and third frame members 23 and 25, respectively. Fastening means, such as fasteners 33, positively secure the liner sheet 27 to the second frame member 24. Confinement means such as for example first and second clamping means 34, 35 releasably retain the first and second liner sheet ends 31, 32, respectively to the first and third frame members 23, 25.

It will be observed in FIG. 1 that wall sections 30A and 30B may be erected above and below the wall section 30. In the preferred arrangement, the liner sheet ends 31, 32 presented by adjacent wall sections, for example the wall sections 30, 30B (or 30, 30A), are slideably retained on the first frame member 23 by common clamping means 34 (or 35).

Thermal insulation 36, only segments of which are shown in FIG. 1 overlying the liner sheets 27A and in FIG. 10, is provided on each of the liner sheets 27. The thermal insulation 36 may comprise glass fiber batts, preformed slabs of foamed plastic material, a layer of foamed-in-place plastic material, and the like.

The facing sheets 29 are substantially coextensive in length with the liner sheets 27 and are positioned outboard of and in spaced-apart relation with the liner sheets 27.

At least first, second and third subgirts 37, 38 and 39 are positioned between the liner sheets 27 and the facing sheets 29, and each is secured to the liner sheets 27 and to the facing sheets 29. The subgirts 37 and 39 will hereinafter be referred to as end-subgirts. Where required, mid-span subgirts 40 may be provided, one positioned between the first and second frame members 23, 24, and one positioned between the second and third frame members 24, 25. The mid-span subgirts 40 are each secured to the liner sheets 27 and to the facing sheets 29.

The liner sheet 27 (FIG. 3) may comprise a flat web 41 presenting upstanding side walls 42, 43 along the opposite longitudinal edges thereof. The side wall 42 terminates in a flange 44 extending laterally therefrom away from the web 41. The side wall 43 terminates in a flange 45 extending laterally therefrom over the web 41. When erected, the facing sheets 27 (FIGS. 6 and 9) are disposed in side-by-side relation with the flanges 44, 45 in overlapped relation.

The facing sheets 29 may have a corrugated profile such as illustrated in FIG. 4. The facing sheet 29 includes crests 46, valleys 47, inclined webs 48 connecting adjacent ones of the crests 46 and the valleys 47, and lateral flanges 49, 50 along the opposite longitudinal edges thereof. The facing sheets 29 are erected (FIG. 6) with the flanges 49, 50 in overlapped relation. Fasteners 51 secure the facing sheets 29 to each of the end-subgirts 37, 39 and the subgirts 38 and 40.

Each of the subgirts 37 through 40 may have the hat-shaped configuration illustrated in FIG. 5, which includes a web 52, depending walls 53 and flanges 54 extending in opposite directions laterally outwardly from the walls 53. The end-subgirt 37 (FIGS. 8 and 9) as well as the other subgirts 38 to 40 are installed with the flanges 54 thereof engaging the liner sheet flanges 44 and with the upper wall 52 thereof engaged by the valleys 47 of the facing sheet 29. As shown in FIG. 16, the end-subgirt 37' (as well as the other subgirts 38 to 40 of FIG. 1) may be reversed such that the flanges 54 are secured to the facing sheets 29 by the fasteners 51, whereas the web 52 is secured to the liner sheets 27 by the fasteners 56.

Each of the subgirts 37 through 40 may have any other suitable profile. For example, FIG. 12 illustrates a Z-shaped subgirt 73 including a web 74 and flanges 75, 75 of substantially identical width. FIG. 13 illustrates a Z-shaped subgirt 73' including a web 74' and flanges 75', 76 of unequal widths. FIG. 14 illustrates a subgirt 77 having a web 78 presenting a flange 79 at one edge thereof, and coplanar, oppositely extending flanges 80, 81 at the other edge thereof. FIG. 15 illustrates a channel-shaped subgirt 82 having a web 83 presenting flanges 84, 85 of unequal widths. FIGS. 17 through 20 illustrate the subgirts 73, 73', 77, and 82 installed between and secured to the facing sheets 29 and the liner sheets 27.

It will be observed in FIGS. 6 and 8 that the second subgirt 38 is secured to the second frame member 24 by fasteners 55 extending through the subgirt flanges 54, the overlapped liner sheet flanges 44, 45, the web 41 of the facing sheet 29 into the second frame member 24. Also, the facing sheets 29 are secured to the subgirt 38 by the fasteners 51. It will be appreciated that the fasteners 32, 51 and 55 cooperate to positively secure the liner sheets 27 and the facing sheets 29 to the second frame member 24 so that the wall section 30 (FIG. 1) remains connected to the structural framework 21 after collapse.

It will be observed in FIGS. 7 and 8 that the end-subgirts 37, 39 are secured solely to the facing sheets 29 by the fasteners 51 and to the liner sheet 27 by fasteners 56.

Referring to FIG. 2, the clamping means 34, 35 may comprise a thin gauge plate 57 provided with spaced openings 58 which receive fasteners 59. The openings 58 preferably are provided along the longitudinal central portion of the plate 57. The plate 57 presents imperforate lateral edge portions 60 on opposite sides of the openings 58. Each of the plates 57 extends along the spaced-apart liner sheet ends 31, 32 (FIGS. 8 and 10) and resides entirely between the upstanding side walls 42, 43 (FIGS. 7 and 9) of each liner sheet 27. The edge portions 60 lap the spaced-apart liner sheet ends 31, 32 — the fastener 59 extending through a gap 62 (FIG. 10) presented between the liner sheet ends 31, 32. A non-hardenable sealant material 61 is provided between each of the liner sheet ends 31, 32 and the frame member 24. When the fastener 59 is tightened, the non-hardenable sealant material 61 is compressed and thereby distributed as shown in FIGS. 8 and 10 to provide a vapor-tight seal. The non-hardenable sealant material 61 also acts as a lubricant and cooperates with the plate 57 and the fastener 59 to releasably retain the liner sheet ends 31, 32 on the frame member 23. The plate 57 and the fastener 59 prevent the liner sheet ends 31, 32 from moving in a direction normal to the plane of the wall structure, but allow sliding of the liner sheet ends 31, 32 in a direction parallel to the plate 57 during collapse.

Alternative embodiments of the confinement means (hereinafter identified as retaining means) are illustrated in FIGS. 21 through 25. Corresponding numerals will be employed to identify corresponding parts heretofore described.

The now to be described retaining means differ from the clamping means 34, 35 in that they do not introduce clamping forces on the liner sheet ends.

Figure 21:
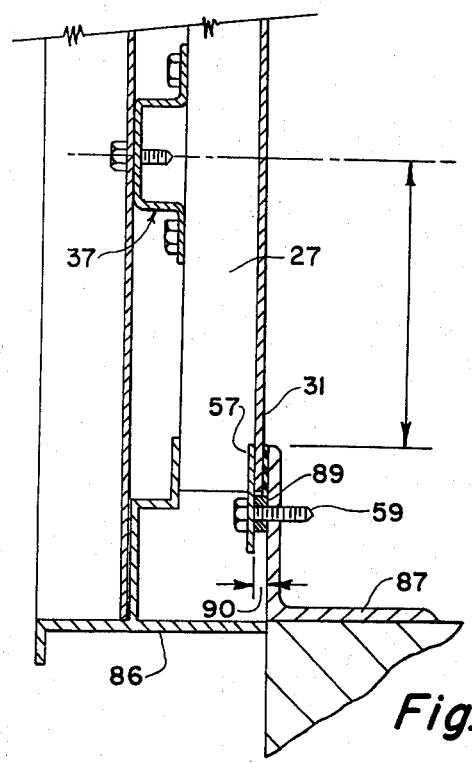
FIG. 21 is a fragmentary cross-sectional view illustrating a bottom condition of the present wall structure.
Figure 22:
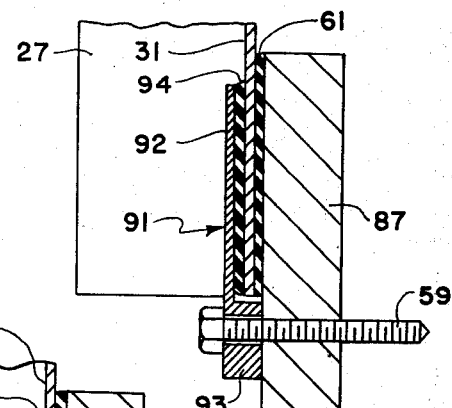
FIGS. 22 through 25 are fragmentary cross-sectional views, similar to FIG. 10, illustrating alternative confinement means.
Figure 23:
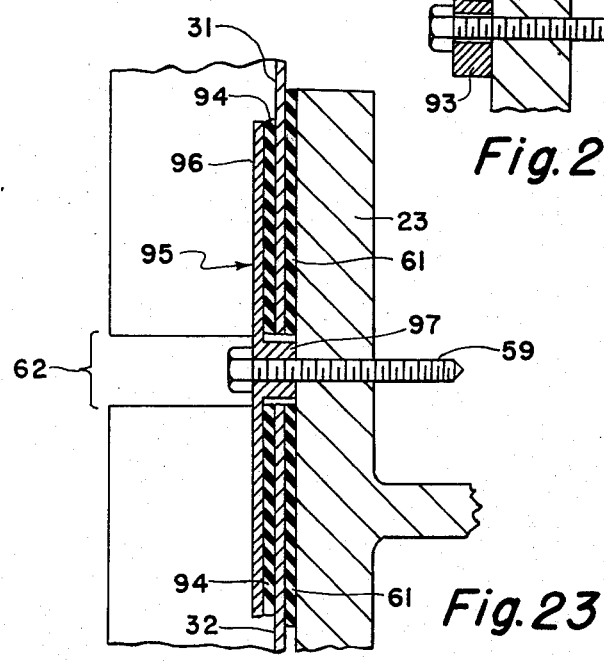

FIG. 21 illustrates a bottom condition of the present wall structure wherein the lower ends of the liner and facing sheets 27, 29 are capped by a closure element 86. The plate 57 is secured to a frame member 87 which is anchored in a concrete slab. In this embodiment, a spacing element 89 in the form of a bar or one or more washers received on the fasteners 59 maintains the plate 57 spaced from the frame member 87 at a fixed distance corresponding to the thickness 90 of the spacing element 89. The thickness 90 is greater than that of the liner sheet end 31, whereby the liner sheet end 31 is not rigidly clamped to the frame member 87 but, instead, is slideably retained on the frame member 87.

Retaining means 91 (FIG. 22) comprises a plate 92 having a spacing hub 93 integrally formed along the entire length of one edge thereof. In this embodiment a second bead of non-hardenable sealant material 94 is disposed between the plate 92 and the liner sheet end 31.

Retaining means 95 (FIG. 23) comprises a plate 96 having a spacing hub 97 centrally located between the opposite edges of the plate 96 and extending along the entire length thereof. The spacing hub 97 is positioned in the gap 62 presented between the adjacent liner sheet ends 31, 32. A second bead of non-hardenable sealant material 94 is disposed between the plate 96 and each of the liner sheet ends 31, 32. In the retaining means 91, 95 (FIGS. 22, 23) the non-hardenable sealant materials 61, 94 act as lubricants, whereby the liner sheet ends 31 and 32 are not rigidly clamped to the frame members 87, 23 but, instead, are slideably retained on the frame members 87, 23.

Retaining means 98 (FIG. 24) comprises a plate 99 having opposite longitudinal edges 101a, 101b, and having a lengthwise slot 100 extending inwardly from the edge 101a thereof. The slot 100 extends along the entire length of the plate 99 and communicates with an enlarged interior pocket 102 provided with a quantity of the non-hardenable sealant material 61. The liner sheet end 31 extends into the slot 100 and penetrates the non-hardenable sealant material 61. To insure a vapor-tight seal, additional non-hardenable sealant material 61' may be disposed between a recess 103 in the plate 99 and the frame member 87. The plate 99 presents a solid portion 115 contiguous with the edge 101b. The fastener 59 extends through the solid portion 115 into the frame member 87.

Retaining means 104 (FIG. 25) comprises a plate 105 having lengthwise slots 100, one extending inwardly from each of the opposite edges 101a, 101b thereof. Each of the slots 100 extends along the entire length of the plate 105 and communicates with an enlarged interior pocket 102 provided with a quantity of the non-hardenable sealant material 61. A solid portion 116 provided between the pockets 102 receives the fastener 59 which secures the plate 105 to the frame member 23. The liner sheet ends 31, 32 extend into the slots 100 and penetrate the non-hardenable sealant materials 61. To insure vapor-tight seals, additional non-hardenable sealant materials 61' may be compressed between the recesses 103 provided along the opposite edges of the plate 105 and the frame 23.

Figure 24:
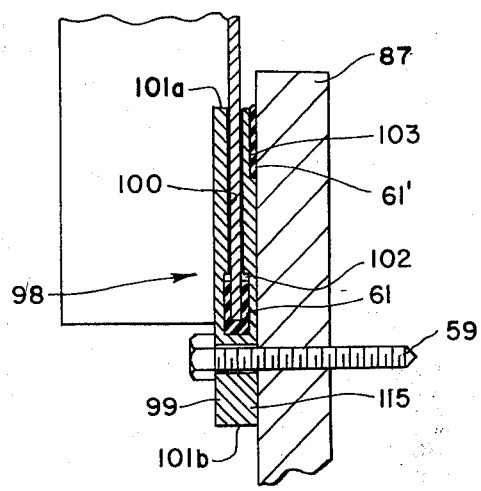
Figure 25:
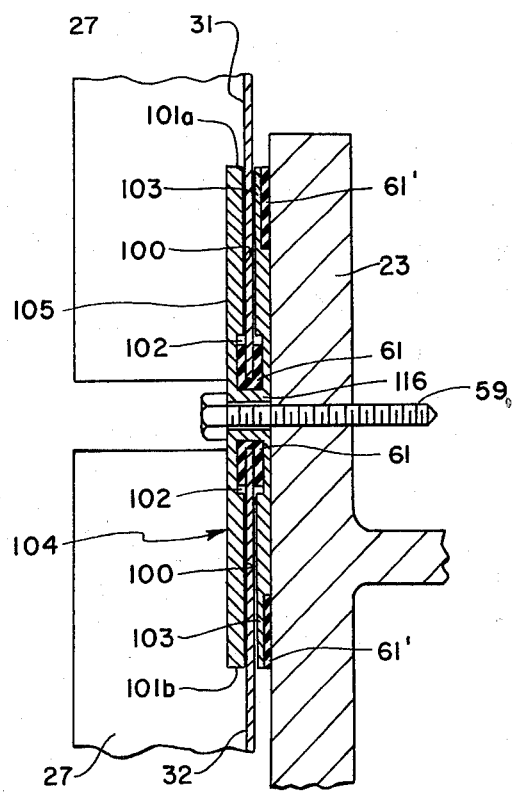

It will be observed in FIGS. 24 and 25 that the width of the slots 100 is greater than the thickness of the liner sheet ends 31, 32, whereby the liner sheet ends 31, 32 are slideably retained on the frame members 87, 23.

It will be observed in FIG. 8 that each facing sheet 29 presents cantilevered end portions 63, 64 extending beyond the end-subgirts 37, 39 into confronting relation with the clamping means 34, 35. In the region of the clamping means 34, the facing sheets 29 present their opposite ends 65, 66 in overlapping relation. Contrary to prior practices, the overlapping ends 65, 66 are not secured together by fasteners. The facing sheets 29 are supported solely by the subgirts 37 through 40.

Reverting to FIG. 5, it will be observed that the hat-shaped subgirt has a longitudinal centerline indicated by the dash-dot line 67. In accordance with the present invention, the hat-shaped end-subgirts 37, 39 (FIGS. 1 and 8) are positioned such that longitudinal lines which in this instance correspond with the longitudinal centerlines 67 are spaced at a selected distance "D" — hereinafter referred to as the end-subgirt spacing D — from the adjacent first and third frame members 23, 25, respectively. The end-subgirt spacing D is measured from the centerline 67 of the hat-shaped end-subgirt 37 (39) to an edge 68 of the frame member 23 (25).

Reverting to FIG. 1 it will be appreciated that the wall sections 30 and 30B comprise double-span constructions, whereas the wall section 30A comprises a single-span construction — the liner sheets 27A thereof spanning the distance between two adjacent frame members 25, 71. The liner sheets 27A present liner sheet ends 31 releasably retained on the frame member 25 by the second clamping means 35; and opposite liner sheet ends 72 positively secured to the frame member 71 by the fasteners 33A. The subgirt 38A which is positioned at the frame member 71 is positively secured to the liner sheets 27A and to the frame member 71 by fasteners, for example by the fasteners 51 and 55 and in the manner illustrated in FIG. 6. It will be observed that the end-subgirt 37A is disposed at the end-subgirt spacing D. Thus in the single-span wall section 30A, the lower end thereof is slideably retained to the frame member 25 whereas the upper end thereof is positively secured to the frame member 71.

Figure 26:
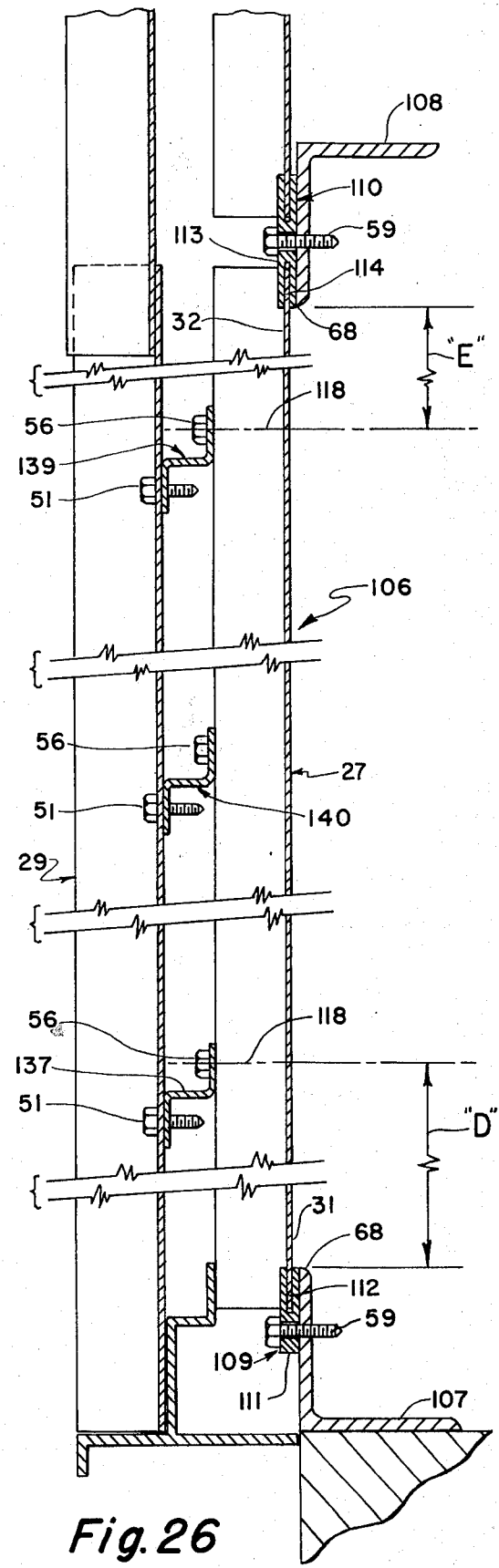
FIG. 26 is a fragmentary, broken cross-sectional view, similar to FIG. 8, illustrating a second embodiment of the present wall structure.

A further alternative embodiment of the present wall structure is illustrated in FIG. 26 and designated generally by the numeral 106. Corresponding numerals will be employed to identify corresponding parts heretofore described.

In this embodiment, the liner sheets 27, erected on a single-span condition, span the distance between adjacent first and second frame members 107, 108 and have opposite liner sheet ends 31, 32 lapping the first and second frame members 107, 108. First and second retaining means 109, 110 slideably retain the liner sheet ends 31, 32 on the frame members 107, 108. The retaining means 109, 110 may comprise plates 111, 113 secured to the frame members 107, 108 by fasteners 59. The plates 111, 113 present lengthwise slots 112, 114 slideably receiving the liner sheet ends 31, 32. Facing sheets 29 are positioned outboard of and in spaced-apart parallel relation with the liner sheets 27. At least two subgirts are provided, for example a first end-subgirt 137 and a second end-subgirt 139 of the type illustrated in FIG. 12. In this embodiment, the first end-subgirt 137 is positioned adjacent to the first frame member 107 but is entirely spaced-apart therefrom in the direction of the second frame member 108. The second end-subgirt 139 is positioned adjacent to the second frame member 108 but is entirely spaced-apart therefrom in the direction of the first frame member 107. One or more intermediate subgirts 140 may be provided as required. It will be observed in FIG. 26 that the subgirts 137, 139 and 140 are positioned between the liner sheets 27 and the facing sheets 29, and each is secured to the facing sheets 29 and to the liner sheets 27 by fasteners 51, 56, respectively.

As will be explained later in this specification, the end-subgirt spacing D controls the failure load of the wall structure. Moreover, the failure load of the wall structure varies inversely with the end-subgirt spacing D, see FIG. 11. Thus it will further be observed in FIG. 26 that at least one of the two end-subgirts, for example the end-subgirt 137, is positioned such that, for example, a longitudinal line 118 of the flange 75 is spaced at a selected distance D from the edge 68 of the adjacent first frame member 107, whereas the second of the two subgirts, that is the second end-subgirt 139, is positioned such that, for example, a longitudinal line 118 of the flange 75 is spaced from the edge 68 of the adjacent second frame member 108 at a distance E which is less than or equal to the aforesaid selected distance D. The significance of the longitudinal line 118 will be discussed later in this specification. If the end-subgirt spacing E is less than the spacing D, then the wall structure 106 will initially collapse at the first frame member 107. However if the end-subgirt spacings E and D are substantially identical, then the wall structure will collapse along either or both of the frame members 107, 108.

END-SUBGIRT SPACING D

The location of the reference point on the wall structure from which the end-subgirt spacing D is measured may correspond to the center of force transfer from the subgirt to the liner sheet. The center of force transfer is considered to be at the fastener attachment of the subgirt to the liner sheet. The location of the reference point also depends on the configuration of the subgirt. For example as shown in FIG. 8, each of the hat-shaped end-subgirts 37, 39 is secured to the liner sheet 27 by two of the fasteners 56, one extending through each of the flanges 54. The location of the center of force transfer is considered to be midway between the two fasteners 56 — that location corresponding to the longitudinal centerline 67 of the hat-shaped end-subgirts 37, 39.

In FIG. 16 the end-subgirt 37' — the orientation of which is 180° from that of the end-subgirt 37 of FIG. 8 — is secured to the liner sheet 27 by the fastener 56 which is installed along the longitudinal centerline 67 of the subgirt 37'. The end-subgirt spacing D is measured from a longitudinal line 117 on the upper wall 52 along which the fastener 56 is installed. The longitudinal line 117 may correspond to the longitudinal centerline 67 (FIG. 5) of the hat-shaped subgirt.

In the subgirts 73, 73', 77 and 82 of FIGS. 17 through 20, respectively, the location of the center of force transfer corresponds to a longitudinal line 118 of the flanges 75, 76, 80 and 85 along which the fasteners 56 are installed. The end-subgirt spacing D may be measured from the longitudinal line 118.

It will be appreciated that by placing the fasteners 56 or by placing the longitudinal centerline of the hat-shaped subgirts at the reference point for the end-subgirt spacing D the location of the end-subgirt on the liner sheet is defined.

The end-subgirt spacing "D" controls the failure load of the wall structure. A general relationship between the failure load of a double-skin wall structure and the end-subgirt spacing of the wall structure has been developed. That general relationship is graphically presented in FIG. 11. The end-subgirt spacing D may vary from about 5 inches to about 15 inches. For most practical applications the end-subgirt spacing D varies from about 6 inches to about 14 inches.

In general, as the end-subgirt spacing is increased, the failure load of the double-skin wall structure decreases curvilinearly, for example in the manner represented by the curve 70 of FIG. 11. Failure loads ranging from about 20 to about 150 pounds per square foot can be provided. However, a failure load in the range of about 40 to about 120 pounds per square foot appears to be adequate for most practical applications.

When a double-skin wall structure of the type illustrated in the drawings experiences abnormally high wind pressures corresponding to the selected failure load, the facing sheet and the liner sheet undergo bending buckling and produce a dragging force which pulls the liner sheet ends 31, 32 free of the confinement means. In the double-span wall section 30 (FIG. 1) the thus freed wall structure portions above and below the central or second frame member 24 collapse in the direction of the applied load. In the single-span wall section 30A (FIG. 1) the thus freed wall structure portion below the frame member 71 collapses in the direction of the applied load while the wall structure 30A remains connected to the frame member 71. In the single-span wall structure 106 (FIG. 26) the entire wall structure is freed and collapses in the direction of the applied load.

The frictional resistance to release offered by each confinement means 34, 35, 91, 95, 98, 104, 109 or 110 is insignificant compared to the magnitude of the aforesaid dragging force. Consequently, the failure load of the double-skin wall structure is not affected by the confinement means 34, 35, 91, 95, 98, 104, 109 or 110.

It as been determined that the failure load of a double-skin wall structure such as illustrated in the drawings, in general, (a) varies inversely with the span; (b) varies directly with the thickness of the facing sheet; and (c) varies directly with the relative stiffness of the facing sheet and the liner sheet. The yield strength of the sheet metal constituting the facing sheet and the liner sheet has no significant effect on the failure load.

Thus in accordance with the present invention, a double-skin wall structure having a specified failure load requirement can be provided by (a) selecting the facing sheet and the liner sheet profiles and gauges based on normal wind load requirements; and (b) thereafter selecting the end-subgirt spacing D which will provide the specified failure load.

I claim:

1. In a blow-in/blow-out wall structure, the combination comprising:
    a building framework including a first frame member and spaced therefrom a second frame member, said first frame member and said second frame member being adjacent to each other;
    a liner sheet spanning the distance between the frame members and having a liner sheet end lapping said first frame member;
    confinement means releasably retaining said liner sheet end to said first frame member;
    fastening means positively securing said liner sheet to said second frame member;
    a facing sheet positioned outboard of and in spaced-apart parallel relation with said liner sheet; and
    at least first and second subgirts
        a. entirely spaced-apart from said first frame member in the direction of said second frame member and from each other,
        b. positioned between said facing sheet and said liner sheet, and
        c. each secured to said facing sheet and to said liner sheet;
    the first subgirt and said first frame member being adjacent to each other;
    said facing sheet having an end portion extending from the first subgirt as a free-ended cantilever and confronting said confinement means;
    the first subgirt being positioned at a selected distance from said first frame member, whereby said wall structure is adapted to disengage from said confinement means at an applied load determined by said selected distance and to collapse in the direction of the applied load, but remain positively connected to said second frame member.

2. The combination of claim 1 wherein said facing sheet is supported solely by said subgirts.

3. The combination of claim 1 wherein said subgirts are parallel with said first frame member.

4. The combination of claim 1 including a bead of non-hardenable sealant material disposed between said liner sheet end and said first frame member, thereby to provide a vapor-tight seal.

5. The combination of claim 4 including a second bead of non-hardenable sealant material disposed between said confinement means and said liner sheet end.

6. The combination of claim 1 wherein said selected distance range from 5 to 15 inches.

7. The combination of claim 1 wherein said confinement means comprises clamping means.

8. The combination of claim 7 wherein said clamping means comprises:
    a plate extending along said liner sheet end and having a longitudinal edge portion lapping said liner sheet end and a second longitudinal portion confronting said first frame member; and
    fastening means extending through said second longitudinal portion, securing said plate to said first frame member.

9. The combination of claim 8 including a spacing element positioned between said plate and said frame member, the thickness of said spacing element being greater than that of said liner sheet end.

10. The combination of claim 9 wherein said spacing element is formed integrally with said plate.

11. The combination of claim 1 wherein
    said building framework includes a third frame member positioned on that side of said second frame member opposite said first frame member, said third frame member and said second frame member being adjacent to each other;
    said liner sheet extends beyond said second frame member and presents a second liner sheet end lapping said third frame member;
    said facing sheet is substantially coextensive in length with said liner sheet; and including:
    second confinement means releasably retaining said second liner sheet end to said third frame member; and
    a third subgirt
        a. entirely spaced-apart from said third frame member in the direction of said second frame member and from said first and second subgirts,
        b. positioned between said liner sheet and said facing sheet, and
        c. secured to said liner sheet and to said facing sheet.

12. The combination of claim 9 wherein said third subgirt and said third frame member are adjacent to each other, and said third subgirt is spaced at a selected distance from said third frame member.

13. The combination of claim 12 wherein the selected distances range from 5 to 15 inches.

14. The combination of claim 11 including beads of non-hardenable sealant material, one compressed between the first said liner sheet end and said first frame member, and the other compressed between said second liner sheet end and said third frame member.

15. The combination of claim 14 including second beads of non-hardenable sealant material, one disposed between the first said confinement means and the first said liner sheet end, and the other disposed between said second confinement means and said second liner sheet end.

16. The combination of claim 11 wherein the first said confinement means and said second confinement means comprise clamping means.

17. The combination of claim 11 wherein the first said confinement means and said second confinement means comprise retaining means.

18. The combination of claim 11 wherein the distance between the first subgirt and said first frame member is less than the distance between the first subgirt and said second frame member, and wherein the distance between said third subgirt and said third frame member is less than the distance between said third subgirt and said second frame member.

19. The combination of claim 1 wherein the distance between the first subgirt and said first frame member is less than the distance between the first subgirt and said second frame member.

20. The combination of claim 1 wherein the second subgirt is secured to said second frame member.

21. The combination of claim 1 wherein said confinement means comprises retaining means.

22. In a blow-in/blow-out wall structure, the combination comprising:
a building framework including spaced-apart first and second frame members and a central frame member intermediate thereof, the first frame member and said central frame member being adjacent to each other, the second frame member and said central frame member being adjacent to each other;
a first liner sheet spanning the distance between said central frame member and the first frame memeber, sid first liner sheet having a first liner sheet end lapping said central frame member;
a second liner sheet spanning the distance between said central frame member and the second frame member, said second liner sheet having a second liner sheet end lapping said central frame member, the liner sheet ends being spaced-apart and pesenting a gap therebetween; confinement means releasably retaining the liner sheet ends to said central frame member;
fastening means positively securing said first liner sheet to said first frame member;
fastening means positively securing said second liner sheet to said second frame member;
first and second facing sheet positioned outboard of the liner sheets and in spaced-apart relation with said first liner sheet and said second liner sheet, respectively;
at least first and second subgirts
  a. entirely spaced-apart from said central frame member in the direction of the first frame member and from each other,
  b. positioned between said first facing sheet and said first liner sheet, and
  c. each secured to said first facing sheet and to said first liner sheet; and
at least third and fourth subgirts
  a. entirely spaced-apart from said central frame member in the direction of the second frame member and from each other,
  b. positioned between said second facing sheet and said second liner sheet, and
  c. each secured to said first facing sheet and to said second facing sheet;
the first subgirt and said central frame member being adjacent to each other;
the third subgirt and said central frame member being adjacent to each other;
said first and second facing sheets having facing sheet ends extending, respectively, from the first and third subgirts as freeended cantilevers which overlap each other and which confront the liner sheet ends;
the first and third subgirts being positioned at selected distances from said central frame member, whereby those portions of said wall structure on opposite sides of said central frame member are each adapted to disengage from said confinement means at an applied load determined by the corresponding one of said selected distances and to collapse in the direction of the applied load, but remain positively connected to said first frame member and to said second frame member.

23. The combination of claim 22 wherein said confinement means comprises clamping means.

24. The combination of claim 23 wherein said clamping means comprises:
a plate extending along said gap and having opposite longitudinal edge portions, one lapping the first liner sheet end and one lapping the second liner sheet end; and
fastening means extending through said gap, securing said plate to said central frame member.

25. The combination of claim 24 including a spacing element positioned between said plate and said frame member, the thickness of said spacing element being greater than that of said liner sheet end.

26. The combination of claim 25 wherein said spacing element is formed integrally with said plate.

27. The combination of claim 22 including beads of non-hardenable sealant material, one disposed between each of the liner sheet ends and said central frame member, thereby to provide vapor-tight seals.

28. The combination of claim 27 including second beads of non-hardenable sealant material, one disposed between each of said opposite longitudinal edge portions and said first and second liner sheet ends.

29. The combination of claim 22 wherein said selected distances range from 5 to 15 inches.

30. The combination of claim 22 wherein said confinement means comprises retaining means.

31. In a blow-in/blow-out wall structure, the combination comprising:
a building framework including a first frame member and spaced therefrom a second frame member, said first frame member and said second frame member being adjacent to each other;
a liner sheet spanning the distance between the frame members and having a liner sheet end lapping said first frame member;

retaining means slideably retaining said liner sheet end to said first frame member, said retaining means comprising a plate having opposite longitudinal edges, a lengthwise slot extending inwardly from one of said longitudinal edges, along the entire length of said plate, and slideably receiving said liner sheet end, and a solid portion contiguous with the other of said longitudinal edges; and fastener means extending through said solid portion, securing said plate to said first frame member;

fastening means positively securing said liner sheet to said second frame member;

a facing sheet positioned outboard of and in spaced-apart parallel relation with said liner sheet; and at least first and second subgirts
  a. entirely spaced-apart from said first frame member in the direction of said second frame member and from each other,
  b. positioned between said facing sheet and said liner sheet, and
  c. each secured to said facing sheet and to said liner sheet.

32. The apparatus of claim 30 wherein said plate presents an interior pocket communicating with said slot, and non-hardenable sealant material disposed within said pocket and penetrated by said liner sheet end.

33. The combination of claim 31 wherein
said building framework includes a third frame member positioned on that side of said second frame member opposite said first frame member, said third frame member and said second frame member being adjacent to each other;

said liner sheet extends beyond said second frame member and presents a second liner sheet end lapping said third frame member;

said facing sheet is substantially coextensive in length with said liner sheet; and including:

second retaining means slideably retaining said second liner sheet end to said third frame member; and a third subgirt
  a. entirely spaced-apart from said third frame member in the direction of said second frame member and from said first and second subfirts,
  b. positioned between said liner sheet and said facing sheet, and
  c. secured to said liner sheet and to said facing sheet.

34. In a blow-in/blow-out wall structure, the combination comprising:
a building framework including spaced-apart first and second frame members and a central frame member intermediate thereof, the first frame member and said central frame member being adjacent to each other, the second frame member and said central frame member being adjacent to each other;

a first liner sheet spanning the distance between said central frame member and the first frame member, said first liner sheet having a first liner sheet end lapping said central frame member;

a second liner sheet spanning the distance between said central frame member and the second frame member, said second liner sheet having a second liner sheet end lapping said central frame member, the liner sheet ends being spaced-apart and presenting a gap therebetween;

retaining means slideably retaining the liner sheet ends to said central frame member, said retaining means comprising a plate having opposite longitudinal edges; lengthwise slots, one extending inwardly from each of said longitudinal edges, along the entire length of said plate, and slideably receiving said liner sheet ends; and a solid portion intermediate of said slots; and fastener means extending through said solid portion, securing said plate to said first frame member;

fastening means positively securing said first liner sheet to said first frame member;

fastening means positively securing said second liner sheet to said second frame member;

first and second facing sheet positioned outboard of the liner sheets and in spaced-apart relation with said first liner sheet and said second liner sheet, respectively, said first and second facing sheets having overlapping facing sheet ends confronting the liner sheet ends;

at least first and second subgirts
  a. entirely spaced-apart from said central frame member in the direction of the first frame member and from each other,
  b. positioned between said first facing sheet and said first liner sheet, and
  c. each secured to said first facing sheet and to said first liner sheet; and at least third and fourth subgirts
  a. entirely spaced-apart from said central frame member in the direction of the second frame member and from each other,
  b. positioned between said second facing sheet and said second liner sheet, and
  c. each secured to said first facing sheet and to said second facing sheet.

35. The apparatus of claim 34 wherein said plate presents interior pockets, one communicating with each of said slots, and non-hardenable sealant material disposed within each of said pockets and penetrated by said liner sheets ends.

36. In a blow-in/blow-out wall structure, the combination comprising:
a building framework including a first frame member and spaced therefrom a second frame member, said first frame member and said second frame member being adjacent to each other;

a liner sheet spanning the distance between the frame members and having a first liner sheet end lapping said first frame member and having a second liner sheet end lapping said second frame member;

first confinement means releasably retaining said first liner sheet end to said first frame member;

second confinement means releasably retaining said second liner sheet end to said second frame member;

a facing sheet positioned outboard of and in spaced-apart parallel relation with said liner sheet; and at least first and second subgirts positioned between said facing sheet and said liner sheet, and each being secured to said facing sheet and to said liner sheet, the first subgirt being adjacent to said first frame member but entirely spaced-apart therefrom in the direction of said second frame member, and the second subgirt being adjacent to said second frame member but entirely spaced-apart therefrom in the direction of said first frame member;

said facing sheet having opposite end portions, one extending from the first subgirt as a free-ended cantilever and confronting said first confinement means, and the other extending from the second subgirt as a free-ended cantilever and confronting said second confinement means;

said first and second subgirts being positioned at selected distances from the first and second frame members, respectively, whereby said wall structure is adapted to disengage from said confinement means at an applied load determined by one of said selected distances and to collapse in the direction of the applied load.

37. The combination of claim 36 wherein said selected distances are substantially identical.

38. The combination of claim 36 wherein said selected distances range from 5 to 15 inches.

* * * * *